US006745382B1

(12) United States Patent
Zothner

(10) Patent No.: US 6,745,382 B1
(45) Date of Patent: Jun. 1, 2004

(54) CORBA WRAPPERS FOR RULES AUTOMATION TECHNOLOGY

(75) Inventor: Eric Zothner, Apex, NC (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/548,499

(22) Filed: Apr. 13, 2000

(51) Int. Cl.⁷ .............................................. G06F 9/44
(52) U.S. Cl. ...................................................... 717/107
(58) Field of Search ................................. 717/101–103, 717/114–119, 120–127; 709/316, 317, 328, 331, 332, 107, 108

(56) References Cited

U.S. PATENT DOCUMENTS

| 6,115,646 A | * | 9/2000 | Fiszman et al. | 700/181 |
| 6,256,676 B1 | * | 7/2001 | Taylor et al. | 709/246 |
| 6,389,588 B1 | * | 5/2002 | Wadhwa et al. | 717/106 |
| 6,442,748 B1 | * | 8/2002 | Bowman-Amuah | 717/108 |
| 6,470,227 B1 | * | 10/2002 | Rangachari et al. | 700/95 |

OTHER PUBLICATIONS

Casati et al. Specification and Implementation of Exceptions in Workflow Management Systems. ACM. 1999. pp. 405–451.*
McGregor et al. Collecting Metrics for CORBA–based Distributed Systems. IEEE. 1998.*

* cited by examiner

Primary Examiner—Wei Zhen

(57) ABSTRACT

A method, system, and software product in which wrappers for rules automation technology are provided. Business rules, business objects, and at least one object agent, representing a corresponding one of the business objects, are provided. The object agent is inserted into a business rules agenda for executing the business rules so that the business rules are directly applied to the object agent, and thereby, are indirectly applied to the corresponding business object. This approach advantageously allows unsophisticated users of rules automation technology to interface with complex business objects and prevents an exception from destroying a business transaction.

24 Claims, 9 Drawing Sheets

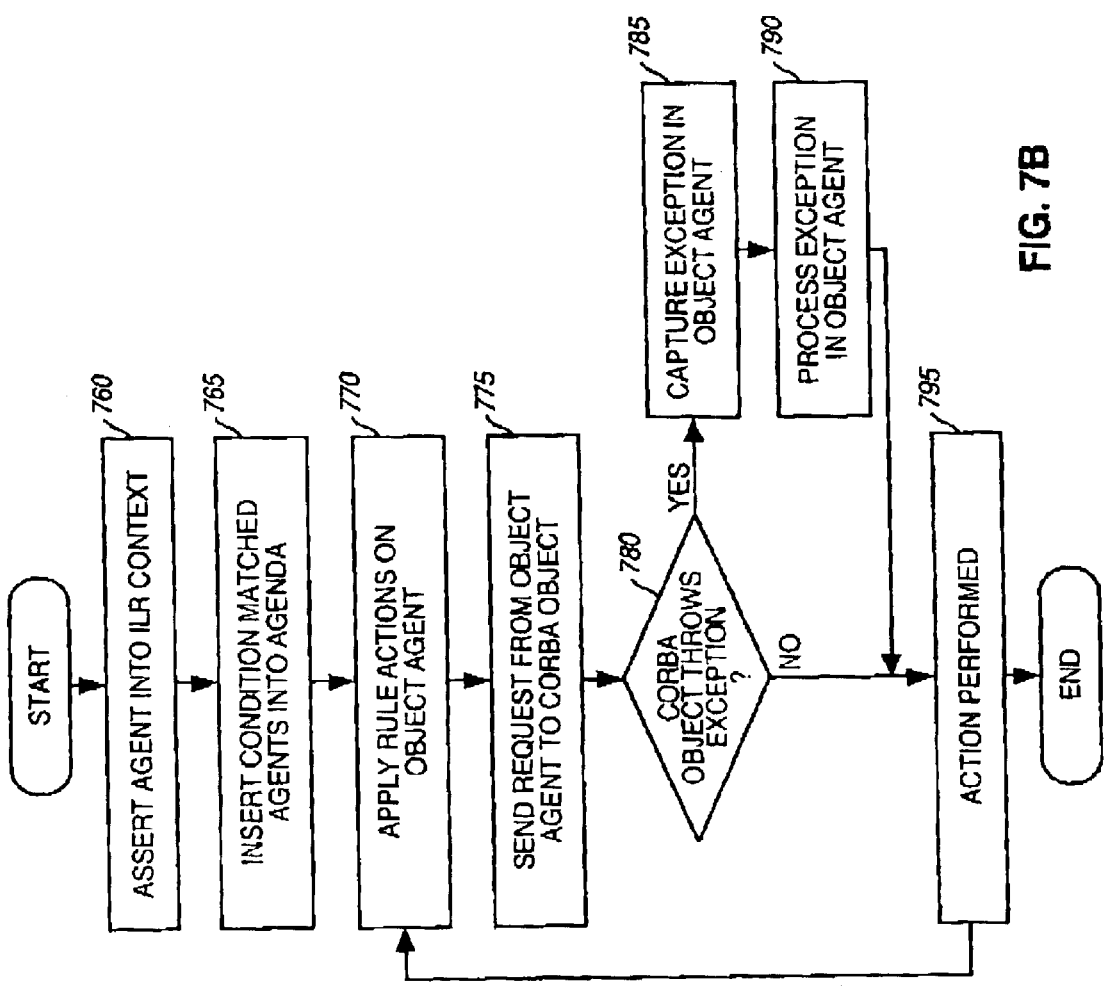

CORBA WRAPPERS FOR RULES AUTOMATION TECHNOLOGY

BACKGROUND OF THE INVENTION

1. Field of the Invention

The present invention relates to a method, system and computer program product for providing CORBA Wrappers for Business Rules and, more specifically, to creating a simple user-friendly interface to CORBA objects which allows an exception to occur without disrupting a transaction within a business rules engine.

2. Discussion of the Background

Rules based processing systems date back to the introduction of LISP (List Processing) to computer technology. LISP was primarily used in the AI (Artificial Intelligence) community to manipulate lists of data. Since that time the rules processing development tools were mostly targeted for simulations and AI type systems. It has only been recently that rules based systems have found newer markets because of easier code maintenance and high data processing performance.

With the advent and subsequent pervasiveness of the Internet, newer web-based technologies have become more dominant in their use and construction. The flexibility of these architectures has been to separate the clients and servers into tiers or levels of abstraction. Also, with the introduction of expert systems, business rule technologies have become more widely used.

Software business rules are the policies and procedures of a business captured in executable format. Business logic is the logic involved in implementing the policies and procedures of the business. In this context, business logic includes the assertions, assumptions and operations that define the policies and procedures of the business. Any software code that is not concerned with manipulation of the computing environment (e.g., retrieving data from storage, memory allocation, service invocations, etc.) is potentially a business rule. Business rules range in scope from simple validations to complex, multi-step procedures. Rules are always aligned with some aspect of business processes (e.g., invoicing, sales, manufacturing), commonly called domains. At the same time, rules are often invoked across business boundaries, for example, a sales application may invoke employee (e.g., human resource) rules to calculate a commission. The separation of business logic from the internal source code has been a design pattern that has been promoted because of the flexibility it affords with respect to code reuse and modularity. A contemporary enterprise is defined by and encapsulated in its information systems. In effect, company policy manuals are now implemented in business software. The impetus for publishing policies and procedures of a business has been to enforce a consistent implementation across the enterprise. Computerization has not changed this requirement. However, implementation of such a system has been costly.

A rule, in general, is a statement that can be used to verify premises and enable a conclusion to be drawn. A rule-based system is an approach to problem solving based on an "IF this, THEN that" approach that uses a set of rules, a database (DB) of information, and a "rule interpreter" to match premises with facts and form a conclusion. There are several considerations associated with implementing business rules for an enterprise. For example, the human reasoning behind a rule, or the "essence" of the rule, is often changed in transitioning from human-oriented user requirements to actual software code. In addition, the same logical rules may be implemented in several different software applications in an inconsistent manner. When rules are implemented as software code, the identification of specific business rules within a software application, or across several software applications, is often difficult or impossible. Also, modifying business rules embedded in traditional software applications in response to changing business conditions is difficult, time-consuming, costly and risky. Various designs and architecture schemes have evolved to address the need to abstract business-level actions from internal code workings of the software components. Object programming languages, client/server and n-Tier architectures, as an example, have become more prevalent as the software industry has evolved.

With existing Rule Automation technology, a software object interacts with the business rules inside a rule agenda (also known as a rule engine) where execution of the rules occurs to accomplish a particular business transaction. However, current systems will not allow an exception to occur inside the rule agenda. That is, if a problem occurs within the agenda, such as an inability to access a particular rules file from a database, the business transaction is terminated and the transaction is destroyed. This may be problematic when business policies are implemented using business rules. For example, when a requestor submits a request that can only be granted if a number of business rules are satisfied, if a problem occurs in the agenda while rules are being applied to the request, the transaction will be destroyed and the rest of the business rules will not be fired. Therefore, the requestor may be granted his request even though all business rules associated with the request have not been complied with.

Moreover, because business rules files can include code commands such as Java or C++ commands directly, a rules administrator has unlimited flexibility in managing a rule automation technology system. This poses a problem, however, in that such flexibility and power requires advanced software knowledge to interface with software objects acted upon by the business rules. Therefore, existing Rule Automation technology does not allow rules administrators to make a modification or use a method off the software object server without complex code calls or access methods.

Based on the foregoing, there is a clear need for a rule automation technology system that allows an exception to occur without disrupting a transaction in the rule agenda.

In addition there is a need for a mechanism for simplifying the interface to software objects used in a Rules Automation technology system.

SUMMARY OF THE INVENTION

According to one aspect of the invention, a computer implemented system is provided for providing wrappers for rules automation technology. The system includes a business rule, a business object, an object agent representing the business object, and a business rules agenda configured to execute the business rule. The object agent is inserted into the agenda so that the business rule is directly applied to the object agent and indirectly applied to the business object to perform a business transaction.

In another embodiment, the system may also include a ruleset class configured to manage the business rule which includes conditions and actions, and a context class which includes the agenda and a working memory in which the business object and object agent are stored. In this particular embodiment, the object agent is condition matched with the business rule according to the conditions, and an object agent matching the conditions is stored in the agenda. The actions are then performed on the object agent in the agenda and indirectly apply the business rule to the business object.

According to another aspect of the invention, a computer implemented method for providing wrappers for rules automation technology is provided. The method includes providing a business rule, a business object, an object agent representing the business object, and a business rules agenda for executing the business rule. The object agent is inserted into the agenda so that business rule is directly applied to the object agent and indirectly applied to the business object.

Yet another aspect of the invention provides a computer readable medium carrying one or more sequences of one or more instructions for providing wrappers for rules automation technology, the one or more sequences of one or more instructions including instructions which, when executed by one or more processors, causes the one or more processors to perform the steps of: providing a business rule, a business object, an object agent representing the business object, and a business rules agenda for executing the business rule. The object agent is inserted into the agenda so that business rule is directly applied to the object agent and indirectly applied to the business object.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7B is a flow chart showing the operation of business rules being applied to an object agent, according to an embodiment of the present invention.

DESCRIPTION OF THE PREFERRED EMBODIMENTS

Figure 1:
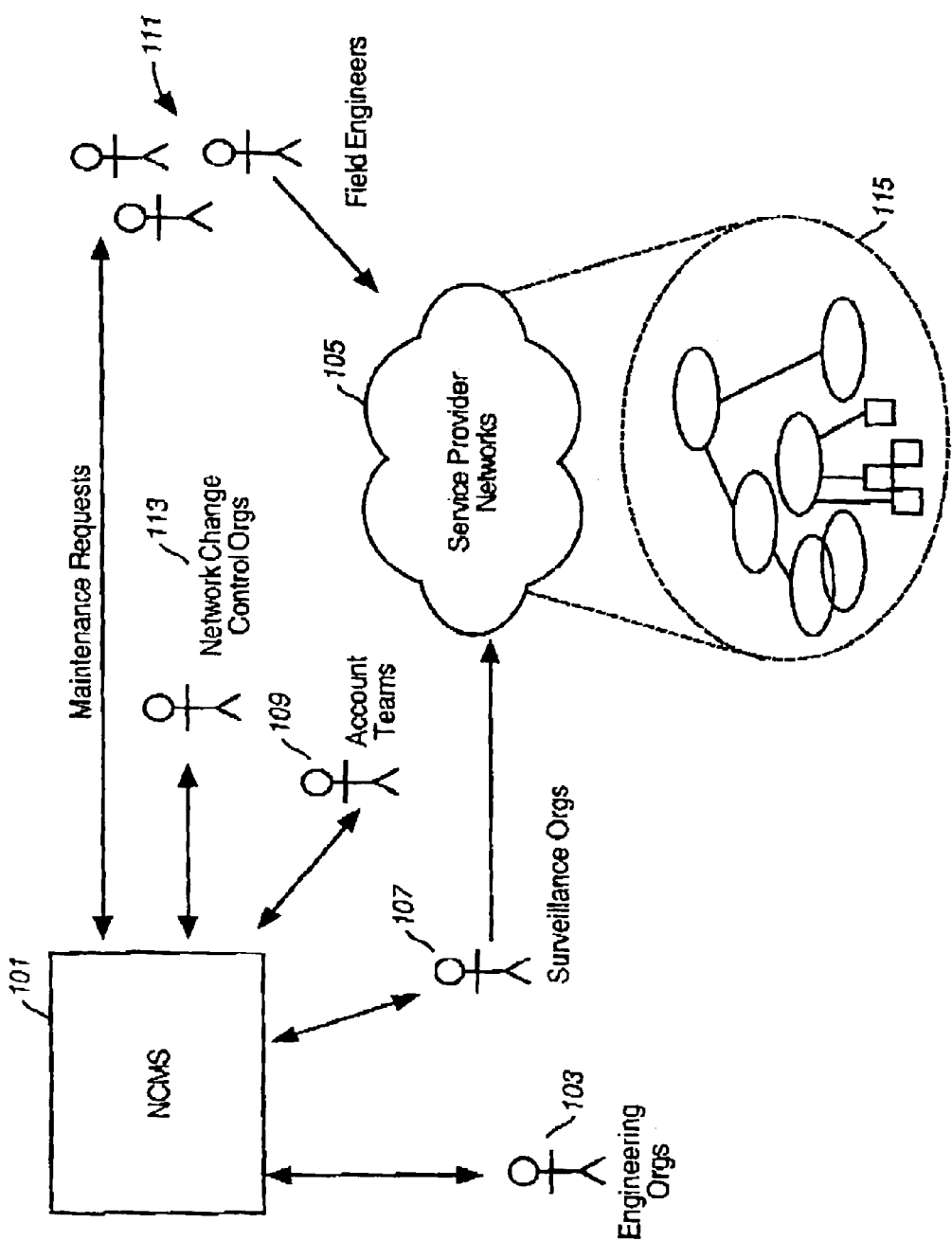
FIG. 1 is a block diagram of the Network Change Management System (NCMS), in accordance with an embodiment of the present invention.

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention accomplishes CORBA wrappers for rules automation technology environments. By providing object agents to represent CORBA objects, the present invention provides a simple interface to the CORBA objects that allows a less sophisticated user to easily implement business policies in a rules automation technology system. Moreover, the object agents allow errors to be filtered and prevented from entering the rule agenda of a rules automation technology system. This advantageously allows the agenda to complete a business transaction without disruption.

Although the present invention is discussed with respect to a design and source code that use a combination of object languages, client/server distributed technologies, and business rule technologies, the design patterns can apply to any computer system regardless of selective architecture, language, or platform.

Network service providers are concerned with availability and reliability of their networks. These parameters are intertwined with the capability of the service provider to respond to maintenance requests from the customers that have traffic on the networks of the service provider. To coordinate these requests, the service provider needs to rely on a robust change management system to ensure that such requests are honored in a timely manner without scheduling conflicts. Change management is a set of complex business processes. The complexity stems from the fact that these business processes as well as the architectures of the service provider networks continually change, such that adaptation to these changes is onerous. Change control systems, or change management systems, operate within a telecommunication environment supporting network operation business processes, which are in constant flux, whereby new networks, customers, circuits, and approval processes are added and changed regularly.

SYSTEM OVERVIEW

The function of the Network Change Management System (NCMS) involves the efficient handling of core operational areas of scheduling, conflict resolution, notification, and reporting associated with the maintenance of the network of the service provider. The expedient treatment of these core operational areas by the NCMS permits a Network Change Control Organization (NCCO), which is the personnel side of NCMS, to focus on identifying and managing the risk inherent during the maintenance of the networks.

The NCMS is a business critical system that supports a network service provider by supplying automated capabilities to optimize scheduling of circuit rearrangements and maintenance events, while validating and reporting customer impacts. Thus, the NCMS is an automatic schedule timeslotting and reporting system, utilizing object-oriented technology and middleware technology. The middleware technology, which distributed and offers network transparency, is specified by the Common Object Request Broker Architecture (CORBA), which is the standard distributed object architecture developed by the Object Management Group (OMG) consortium.

Furthermore, the NCMS, according to one embodiment, utilizes the JAVA language specification. JAVA applications coupled with CORBA compliant middleware enables object to object communication between the objects in client and server roles. In a CORBA environment, an Object Request Broker (ORB) receives request for services of software modules from programs on clients and servers. The JAVA/CORBA ORB middleware enables distribution of objects, making the NCMS appear as a single system.

This architecture advantageously allows flexibility, scalability and adaptability to changing business conditions.

The NCMS encompasses JAVA-based client/server applications that are integrated with a business rule server. The business rule server applies system responses and actions to information that are contained within objects that are passed by reference.

JAVA provides operating system independence, enabling language flexibility and code-reuse. JAVA applications and applets used with a JAVA Virtual Machine (JVM) can run on any OS platform that supports the JVM. The framework that allows the abstraction and control of system responses to the trigger conditions can allow or map any business condition or process state to that of a system action.

To appreciate the present invention, it is instructive to discuss briefly the Common Object Request Broker Architecture (CORBA) specification as well as object-oriented technology in general. CORBA is a specification that enables software modules to communicate with other software modules in other programs, even if the two programs are written in different programming languages and are running on different platforms. A software component is an individual modular software routine that has been compiled and dynamically linked, and is ready for use with other software components and programs. A software component has an intended purpose, which is to perform a specified function or functions. A software application is a collection of software components and an application facilitates the interaction between software components using the underlying communications infrastructure.

A software module is a collection of software components and data structures that perform a particular task or implements a particular abstract data type. A software object, in object-oriented programming, is a variable that has both software routines and data. The variable is treated as a discrete entity.

A program is a sequence of instructions that can be executed by a computer. A program may include a collection of software modules and/or a collection of software components. A software application is a program designed to assist in the performance of a specific task, for example, word processing, accounting, inventory management, software module management, and network management of software applications. A data element is a single unit of data, for example, a single bit value representing a value of true or false or a numeric value of 0 or 1, a sequence of bits representing a name, a sequence of bits representing a numeric value, or a single unit of data including a combination of data elements.

Systems information is data relating to the status of a software and/or hardware computer system, for example, data relating to whether a particular hardware or software component is functional or non-functional, and data relating to static or dynamic interfacing of various hardware and/or software components in a computer system or network. Functional means that the software component is performing its intended function, and non-functional means that the software component is not performing its intended function. In this context, a static interface means an interface between software components that is predetermined on the computer system. Additionally, predetermined means determined at the time of compilation of the code involving the software component. Further, dynamic interface means an interface between software components that is not determined at the time of compilation.

In a CORBA environment, a program makes a request for services of software modules through an ORB, and thus, does not need to know the design and composition of the program, which includes the software. In client/server applications, an ORB is an interface to which the client makes a request for service from a software object. The ORB then directs the request to the server hosting the software object and returns the resulting value(s) of the service to the client.

In an object-oriented programming environment, a client is defined as a member of a class or group that uses the services of another class or group to which the client is not related by way of inheritance from a common class or group. More generally, a client is a software module that requests a service provided by another software module. The client uses the requested service without having to know any working details about the other software module or the service. In a network environment, a server is defined as a computer or program that responds to commands from a client.

In a large enterprise such as a corporation, enterprise computing is the use of computers in a network or series of interconnected networks that generally encompass a variety of different platforms, operating systems, protocols, and network architectures.

Middleware is software that is transparent to a user, which takes two or more applications and makes them work seamlessly together. With middleware technology, a user can design an ordinary component to provide its regular function, and then insert an appropriate middleware mix when the component is built or created at run time. For instance, CORBA is a middleware project.

A CORBA object bus defines the design of the resident components and how these components communicate with one another. CORBA was designed to allow intelligent components to discover each other and interoperate on an object bus. However, CORBA goes beyond interoperability. CORBA also specifies an extensive set of bus-related services for creating and deleting software objects, accessing them by name, storing them in persistent stores, externalizing their states, and defining ad hoc relationships between them. CORBA software objects are components of intelligence that may reside anywhere on a network. They are packaged as binary components which remote clients may access via method invocations. Both the language and compiler used to create server software objects are transparent to clients. Clients have no need to know where the distributed software object resides or on what operating system it executes. The distributed software object may be in the same process or on a machine that sits across a large network. Additionally, clients have no need to know how a server software object is implemented. For example, a server software object may be implemented, for example, as a set of JAVA classes, or it may be implemented as a large COBOL (Common Business-Oriented Language) program. The client only needs to know the interface its server software object publishes. The interface then serves as a binding contract between clients and servers.

Such interface specifications are written in a neutral Interface Definition Language (IDL) that defines a component's boundaries; that is, its contractual interfaces with potential clients. Components written to IDL are accessible across languages, tools, operating systems, and networks.

IDL-specified methods can be written in and invoked from any language that provides CORBA bindings. Examples of such languages include JAVA, C, C++, Ada and Smalltalk. Programmers interact with CORBA software objects using native language constructs. IDL provides operating system and programming language independent interfaces to all the services and components that reside on a CORBA bus. This allows client and server software objects written in different languages to communicate with one another. OMG IDL is utilized to specify a component's attributes, the parent classes from which the component inherits, the exceptions it raises, the typed events it emits, and the methods its interface supports, including the input and output parameters and their data types. The CORBA IDL allows component providers to specify in a standard definition language the interface infrastructure of the software objects that they provide.

The CORBA Object Request Broker is the software object bus. As previously indicated, the ORB enables software objects to transparently make requests to, and receive responses from, other software objects located locally or remotely. The client is not aware of the mechanisms used to communicate with, activate, or store these server software objects. A CORBA ORB provides a wide variety of distributed middleware services. The ORB allows software objects to discover each other at run time and invoke each other's services. An ORB is much more sophisticated than alternative forms of client-server middleware, including traditional Remote Procedure Calls (RPCs), Message-Oriented Middleware, database stored procedures, and peer-to-peer services.

With an RPC, a specific function is called, and data is separate. In contrast, with an ORB, a call is made to a method within a specific software object. Different software object classes may respond to the same method invocation differently, through polymorphism. Since each software object manages its own private instance data, the method is implemented on the specific instance data. Thus, a call reaches a specific software object that controls specific data, and then implements the function in its own class-specific way. In contrast, RPC calls have no specificity—all functions with the same name are implemented the same way. A server cannot tell the difference between a static or dynamic invocation; they both have the same message semantics. In both cases, the ORB locates a server software object adaptor, transmits the parameters, and transfers control to the software.

The NCMS takes advantage of the flexibility and modularity of CORBA, coupling it with business rule technology. The NCMS is a unique type of client/server technology that supports management of maintenance events. Maintenance events, in an exemplary embodiment, are requested primarily by field engineers to perform maintenance on the circuits and equipment within the service provider's networks. Further, business rule engine technology permits modified on-the-fly and/or without any source code changes.

FIG. 1 is a block diagram of the Network Change Management System, in accordance with an embodiment of the present invention. In particular, the FIG. 1 illustrates the interaction between the NCMS 101 and the numerous actors 103, 107, 109, 111, and 113 within the organization of the service provider. These actors 103, 107, 109, 111 and 113 may be humans or software agents. The NCMS 101 receives information from across the entire organization. The engineering organizations 103 supply scheduling and planning information regarding the network elements (e.g., switches, digital cross-connects (DXC), and etc.) 115 of the service provider network 105 to the NCMS 101. Through these actors 103, 107, 109, 111 and 113, the NCMS 101 is made aware of all design changes or plans with respect to the networks 105 in order to schedule the implementation of the design, as to minimize the disruption to the customers with traffic riding on network circuits. The network surveillance organizations 107 monitor alarms emanating from the networks (e.g., data networks, circuit switches networks, etc.) 105 and provide this information to the NCMS 101 in the form of completion status to the scheduled maintenance requests. To ensure that the customers are not gravely affected by any operational activities of the NCMS 101, the NCMS 101 notifies the account teams 109. Furthermore, the field engineers 111, who are responsible for installation and repair of the networks 105, submit maintenance requests to NCMS 101 as part of their job function. In response, the Network Change Control Organization (NCCO) 113 provides approval information regarding the operational activities to NCMS 101 as well as set policies concerning all aspects of network maintenance and operation.

The NCCO 113 provides the following services: scheduling, customized notification, customized reporting, conflict resolution, research and trending, and information services (i.e., providing plan maintenance data to other systems). The NCCO 113 initiates the scheduling of events (e.g. upgrading of a circuit) using the NCMS 101, which outputs a list of scheduled and nonscheduled events, for example. If the schedule is modified or updated for any reason, the NCMS 101 automatically updates in real-time and provides the revised schedule, which can be accessed by a user, for example, via a web interface.

The scheduling process applies scheduling and business rules to transform a request from the field engineers 111 into a scheduled maintenance event. Upon failure of a business rule, the scheduling process forwards the event to the conflict resolution process. The conflict resolution process is entered from the scheduling process when certain events exhibit common elements, such as identical date and time for the event.

Figure 2:
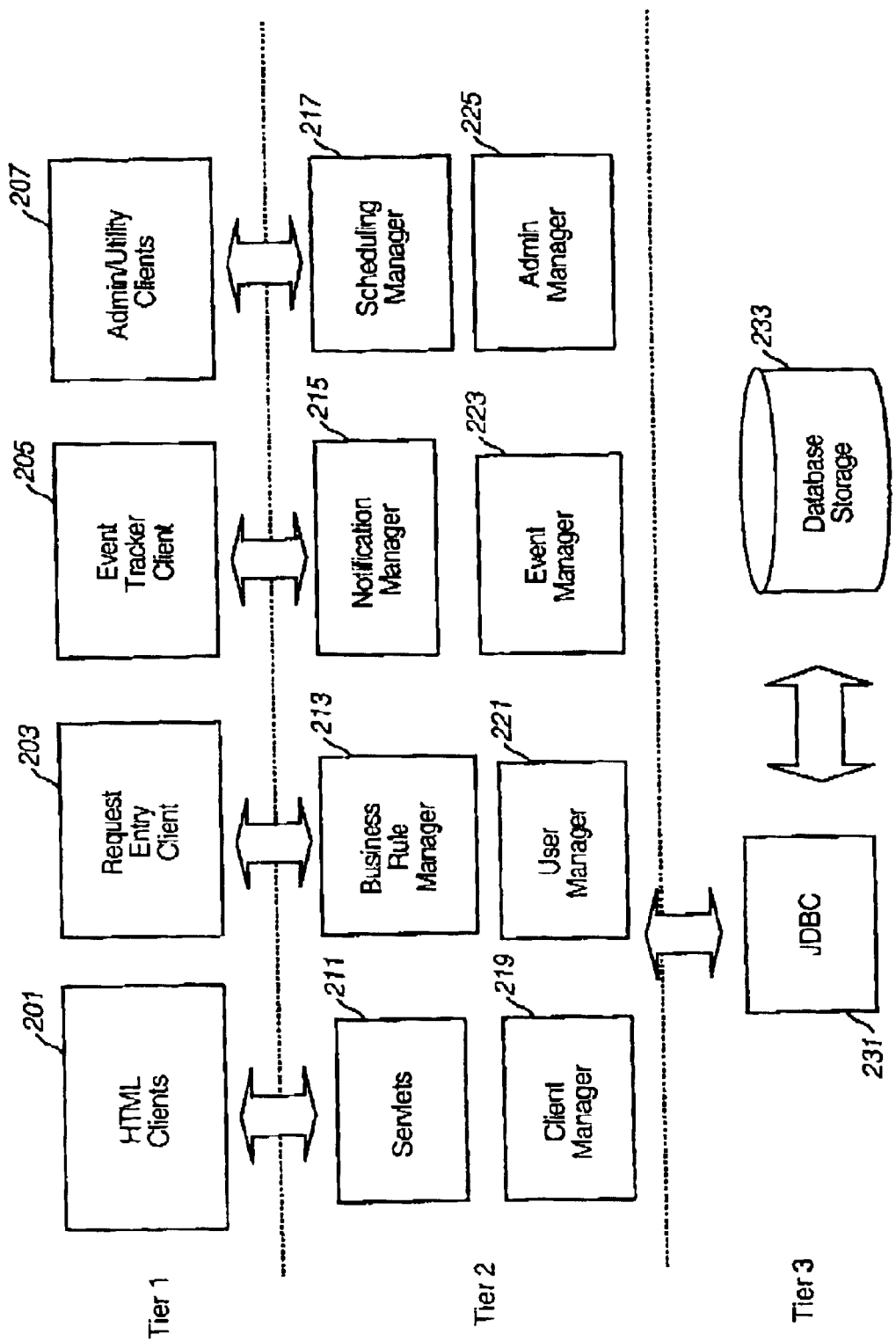
FIG. 2 is a diagram of the NCMS functional architecture of the system of FIG. 1.

FIG. 2 is diagram of the NCMS functional architecture. The NCMS 101 has a multi-tier distributed architecture: presentation logic, business logic and data storage, corresponding to Tiers I-III. Tier I is the primary interfaces for user interactions; these interfaces are supplied by various clients: HTML clients 201, Request Entry client 203, Event Tracker client 205, and Administrative/Utility client 207. The clients 203, 205, and 207 are JAVA applications, which can be downloaded to the users' computers (not shown). These clients 201, 203, 205, and 207 interface directly with business application servers (i.e., Tier II) that are distributed across the service provider network 105. The HTML clients 201 allow users to create and update their user profiles, which define their customized features and security access to the NCMS 101. The interfaces of the Request Entry client 203 permit users to enter maintenance request information interactively, providing real-time feedback and validation to the users. The Request Entry client 203 also processes updates to requests that have been entered. Client 203 contains several sub-processes to handle validations of request information, including business rule validation, field level input validation, and scheduling confirmation. The Event Tracking client 205 enables users to approve, deny, cancel events and provide real-time state changes to filtered views. The Admin/Utility clients 207 allow specialized interaction with common administrative data, management of users, notification controls, and business rule testing. These client applications 201, 203, 205 and 207 depend on the Tier II business services.

These Tier II business services reside on a multitude of servers, which encapsulate the business logic and business rules that are used throughout the NCMS 101. Essentially, these servers provide shared services that the client uses for its application logic. Within Tier II are the following business services: servlets 211, a Business Rule Manager 213, Notification Manager 215, Scheduling Manager 217, Client Manager 219, User Manager 221, Event Manager 223, and Administration Manager 225.

The Notification Manager 215 provides external communication services, including e-mail, paging, and faxing. The Scheduling Manager 217 provides planning and optimization services for receiving requests from the user into the most optimal scheduled time slot. The Scheduling Manager 217 also provide services such as the best available time slots, planning constraints based on business rules, and schedule management.

The User Manager 221 is responsible for controlling the User, Role and UserProfile objects, which represent the user's preferences. From the perspective of a design pattern, the User Manager 221 is a server object that functions both as a Factory object and a Manager object. The functionality of the User Manager 221 includes instantiation and registration of User, Role and UserProfile objects, management of these objects during their lifetimes, and graceful deactivation of these objects. Basic user information (e.g., identity and contact information) is captured in a User object. Each UserProfile inherits this basic information from a User object and carries login and customized information. Furthermore, each UserProfile is assigned a Role, which is used to control security accesses and permissions. The User Manager 221 provides handling of user login/logout to the NCMS 101. In addition, the User Manager 221 performs creation, management, and removal of roles and user profiles. The User Manager 221 also retrieves information that is captured in each user profile. The User Manager 221 locks and unlocks the user profiles (i.e., inactivate/reactivate user accounts).

The Event Manager 223 is a Factory server and contains the processes for monitoring and processing events. The Event Manager 223 interacts with the client interface to provide real-time updates on the events. Event services, as provided by Event Manager 223, offer push-technology to the client interfaces to allow an efficient model of real-time data transfer. The Event Manager 223 employs listener/subscriber components that interact between the client and servers to provide updates of event information to the client interface. Further, Event Manager 223 is a CORBA persistent object. Clients bind to the Event Manager 223, which creates new events, retrieves object references to existing events, forces event conflicts, and updates an the approval status on an event. Additionally, the Event Manager 223 obtains customer impact information and event list data. The Administration Manager 225 service handles all management of threshold values, user security, user profiles, message templates, and etc. These servers 211, 213, 215, 217, 219, 221, 223, and 225 within Tier II interact with data storage devices and other external interfaces of Tier III.

Tier III contains the primary data storage for the NCMS and includes a JDBC (JAVA Data Base Connectivity) driver 231 that enables the Tier II servers to link to database 233. The database 233, according to an exemplary embodiment, is a RDBMS (relational database management system).

Figure 3:
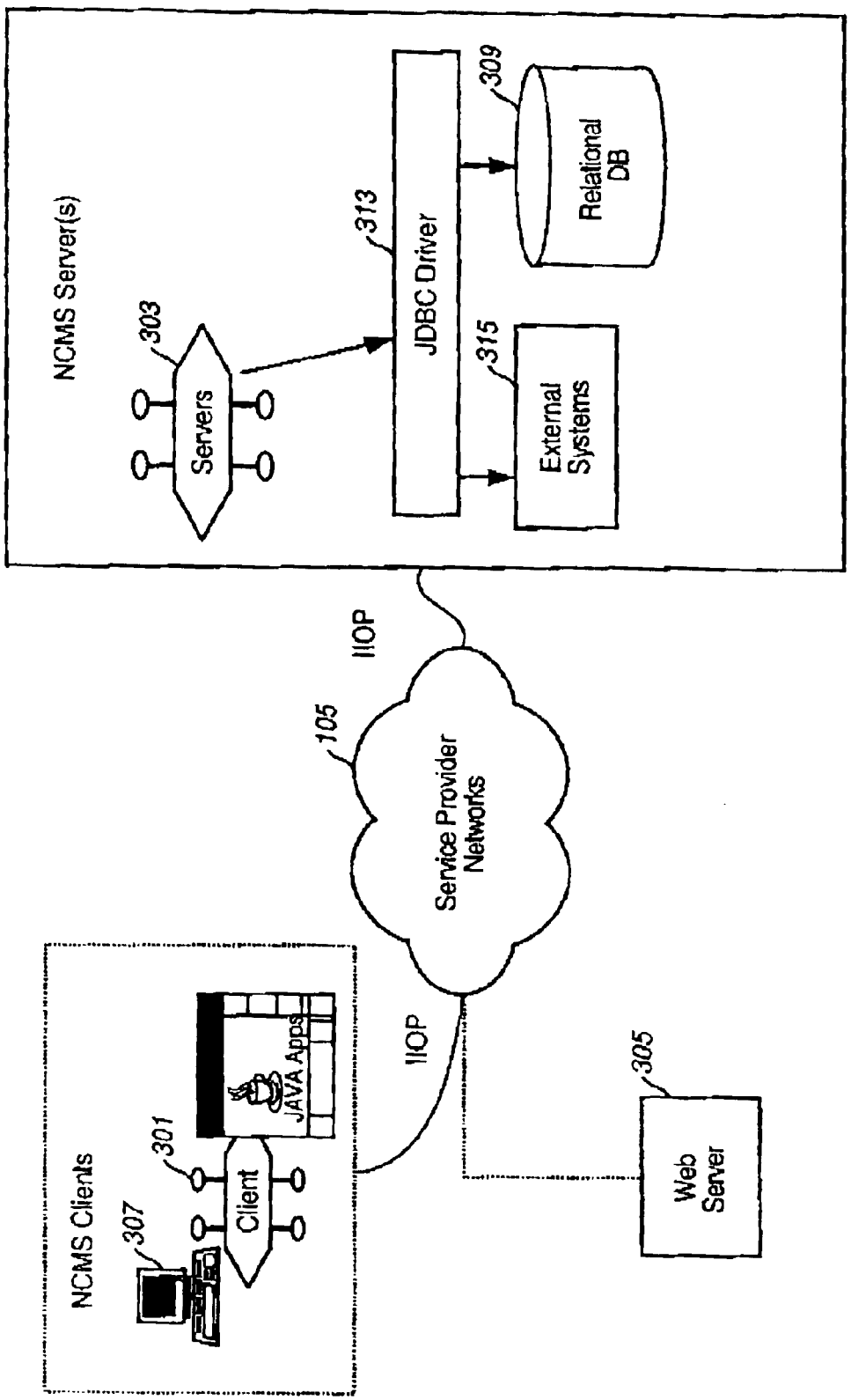
FIG. 3 is a diagram of a Common Object Request Broker Architecture (CORBA), in accordance with an embodiment of the present invention.

FIG. 3 is a diagram of a Common Object Request Broker Architecture (CORBA)-based software architecture of the NCMS, in accordance with an embodiment of the present invention. The software architecture is shown as a set of CORBA services and middleware processes that are instantiated to support request handling management, scheduling of circuit rearrangements and maintenance events, and validation and reporting of customer impacts. As previously discussed, CORBA provides a network independence architecture that allows distribution of JAVA-based applications to any networking platform. CORBA as a standard provides a rich set of system-level services; i.e., object services, such as transaction processing and security. In an exemplary embodiment, the ORB is Visibroker for Java by Inprise Corporation.

Utilizing the Internet Inter-ORB Protocol (IIOP), NCMS clients 301 communicate with NCMS servers 303 via the service provider networks 105. For HTML clients, a web server 305 is attached to the service provider network 105. The web server 305 can be used in conjunction with the NCMS clients 301 to interact with the user and the client software. For example, this architecture permits ease of client software upgrades. In such a case, a user downloads a client software from the web server 305 and installs a JAVA application onto a user PC (personal computer) 307. Each time a client application is started, the client application checks if it has the latest copy of the software and/or JVM by issuing requests to the NCMS servers 303. In turn, the NCMS Client 301 prompts the user to determine whether the user desires to upgrade to a new version of the software.

The NCMS servers 303 interact with a relational database 309 to obtain data. To retrieve data from the relational database 309, the servers 303 communicate with a JDBC driver manager 313, which exchange messages with relational DB 309. The driver module 313 also communicates with various other external systems 315 (e.g., legacy systems).

Figure 4:
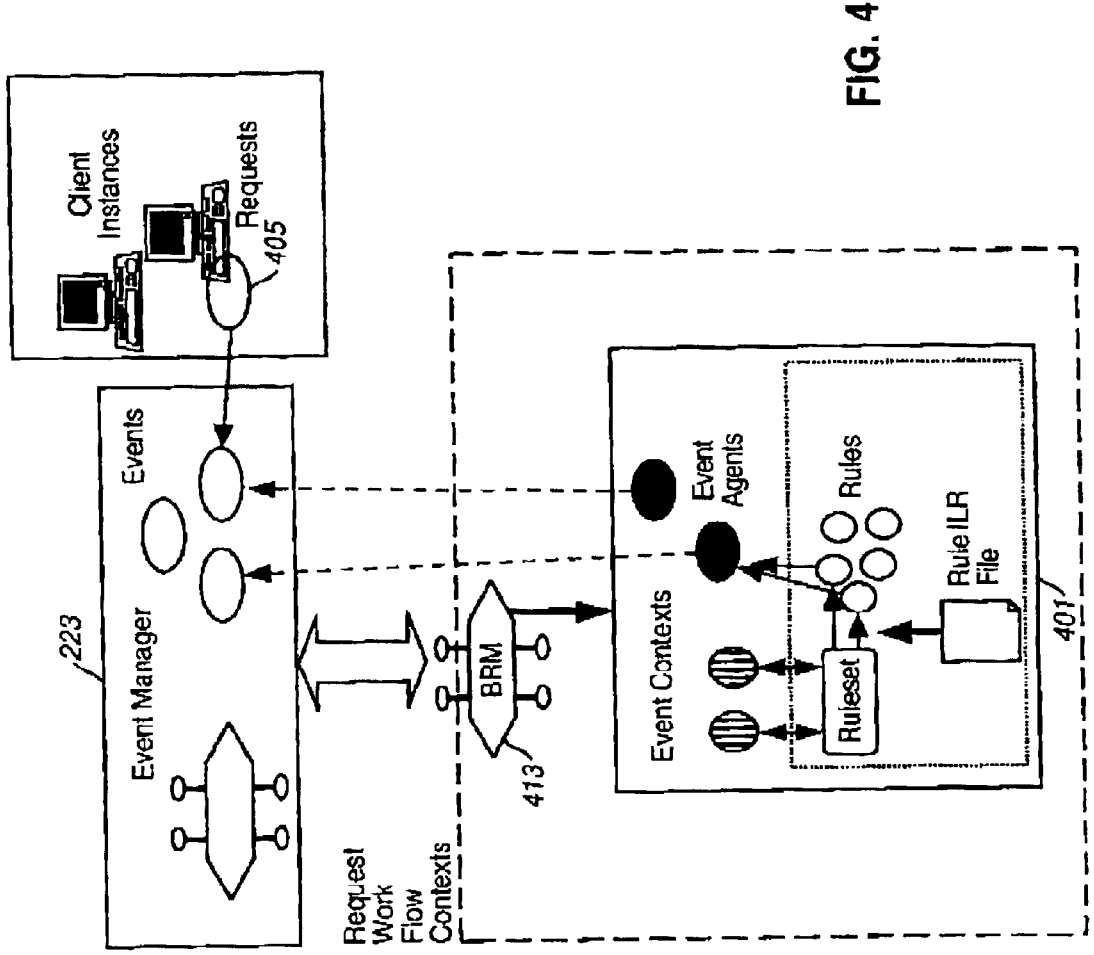
FIG. 4 is a diagram of the business rule manager (BRM) interacting with the event manager, according to the system of FIG. 1.

FIG. 4 is a diagram of the Business Rule Manager (BRM) interacting with the Event Manager. The BRM architecture is based on a centralized approach to managing rules. Agents are used in the rules engine to provide an easy to use application programming interface (API) for access to the business objects. BRM 413 is a stand-alone CORBA server that is responsible for the execution of all business rules. BRM 413 uses other NCMS 101 services to send notifications, update and check other CORBA objects.

Rules can be managed or modified directly by the NCCO 113 without shutting down the NCMS 101. Additionally, rules can be applied to any NCMS object. The BRM 413 encapsulates the Event Contexts and Rule sets 401, which process business rules that act on Events contained within the memory space of Event Manager 223. A Request Work Flow 405 client process is integrated with NCMS clients 401, which communicate through Event Manager 223 and then finally to the BRM 413 to process requested rules in real-time. A rule repository identified within 401 stores business rules, for example, as an ASCII (American Standard Code for Information Interchange) files.

CORBA WRAPPERS FOR BUSINESS RULES

For certain business processes, it may be necessary to hide the complexity of an interface to an object. For example, a situation may arise where an unsophisticated user may want to use a single user friendly method in a rule to get information out of an object without interfacing with a number of complicated methods that are internal to the CORBA object. Moreover, it may be necessary to throw an exception when a method is called to an object. For example, when a method is called on a CORBA object and the method cannot be read from the database, it may be desirable to generate an error message and capture an exception without the rules system failing. The mechanism for accomplishing these tasks is depicted in FIG. 5.

Figure 5:
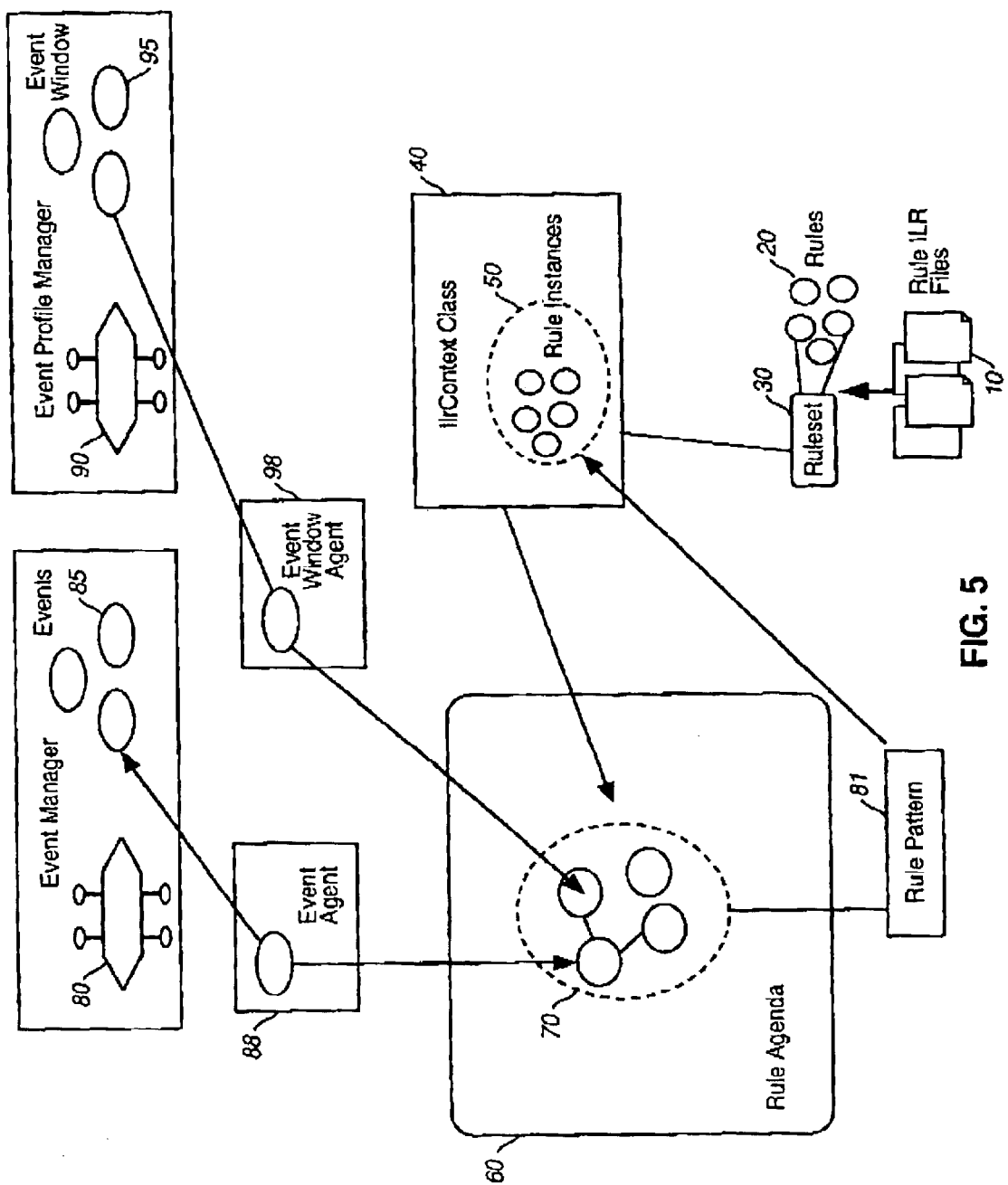
FIG. 5 is a diagram of a Rules Automation technology system, according to an embodiment of the invention.

In FIG. 5, IlrRules files 10 are read by the NCMS 101. During the startup process of the server, NCMS 101 performs initialization operations to process rulesets and connect to the other necessary CORBA Services. Rules 20 are written for a particular business process and loaded into memory from IlrRules files 10. The Rules 20 are written in a standard object-oriented programming language (OPC-5) format and can be loaded from an ASCII file, or alternatively, from a database (or web page etc). The IlrRule files 10 are located on a production server in a directory called, for example, "rules". This directory resides off of the main directory for the class files.

The Rules 20 are read into memory and transferred into Rules 10, which are associated with a Ruleset 30. A Java ruleset class that is responsible for management of the Rules 10 provides parsing methods which are used to create Rules 20 that are exhibited in a Ruleset 30. That is, an instance of the Java ruleset class represents a rule base which is an entity that manages a base of rules. Rules in the rule base come from input units that are parsed by the methods of the Java class, and Ruleset 30 then exhibits the Rules 20 that the Ruleset 30 contains as objects. To create a rule set, the class of the execution context must be supplied. The class of the execution context defines the set of methods and fields to which the rules have access. This ruleset class, together with the IlrContext class 40, constitute the main classes of the Ilog rules package.

The Ruleset 30 is associated with an Ilrcontext class 40 that provides the framework, or context, of processing rules and objects that are inserted into the context. IlrContext 40 is the ILOG Rules execution context. Rules can be executed only within an execution context. An IlrContext 40 is always attached to an IlrRuleset 30. If the context is created without a ruleset passed as an argument, the context will create its own rule set. IlrContext 40 can be derived to include additional fields and methods. These methods and fields can be used in the rules. IlrContext 40 contains all the methods required to control the rules engine. While the ruleset class is responsible for the management of the rules, IlrContext 40 is responsible for the execution of the rules.

Objects of the IlrContext 40 class can be instantiated from the Ruleset 30. IlrContext 40 is an execution context that initially contains all the rules in the rule set. A context is created using a rule set, to which the context is said to be attached. The rule set owns a list of contexts.

Rule Instances 50 are objects that are created when a pattern match, per rule pattern 81 is made within the IlrContext class 40, and must be connected to the business objects. The Rule Instance object 50 can then apply its rules to the business objects by deducing and prioritizing actions according to their status. Business objects are handled by the Java part of the application and are made available for use in filtering. These objects can be modified but not deleted. All deduced actions are stored in a Rule Agenda 60.

The IlrContext class 40 includes the Rule Agenda 60 containing all the Rules 20 whose conditions are satisfied at a given moment. In the Rule Agenda 60, the Rules 20 are sorted according to their priority; for dynamic priority, a computation is performed when each Rule 20 is inserted into the Rule Agenda 60. The IlrContext 40 also includes working memory where business objects are stored while the Rules 20 are working on them.

The Rule Agenda 60 is a specific thing that implies that conditions are filtered in a nodal network and the conditions that are not satisfied are dropped out of the network. Specifically, the Rule Agenda 60 is dynamically maintained by the RETE network when the business objects are modified. The RETE network is the specific rule network built during the generation of Java code, and is event-driven during code execution. As mentioned, RETE is an internal filtering algorithm that constructs a Network 70 containing nodes that correspond to the different conditions of the Rules 20. When tests can be shared between rules, the network reflects this characteristic and thus saves space. At run time, rule actions are performed on business objects that match rule conditions. These actions may require a reorganization of the Rule Agenda 60. When modifications are done on the business objects, and notified to the RETE, tokens circulate inside the network when conditions are met. When a token reaches the lowest level of the RETE, the corresponding Rule can be potentially run. This is a reactive propagation performance process that has no impact on application performance. After several iterations, all the conditions are met and all actions are performed the typical rules processing system ends the processing loop.

The Event Manager Domain is responsible for the creation, modification, and overall management of events, as well as validating equipment and pulling customer impacts for events. Moreover, the Event Manager Domain communicates with many other software domains to implement the NCMS system.

Specifically, clients bind to the Event Manager 80 and call its operations to accomplish a variety of tasks. Table I provides a list of the principal operations of the Event Manager 80. As seen in this table, the Event Manager 80 acts as an object factory for creating Event objects 85. The Event object 85 is the primary CORBA transient object created by the Event Manager 80 and has many objects linked to it in aggregate(containment by value) relationship, such as EventCode object, AdditionalContact object, ApprovalAuthority object, and ConflictingEvent object. The Event object 85 is the most dynamic object in the NCMS system 101 and undergoes a variety of event states.

Table I: Principal operations of Event Manager 80

TABLE I

Principal operations of Event Manager 80

| Operation | Description |
| --- | --- |
| CreateEvent( ) | This operation is called to create a new instance of an Event object on the server and get a reference to that object. |
| OpenEvent(EventID, UserID, ClientHostName) | This operation is called to get a reference to an existing Event object. The EventManager maintains a Java.util.Dictionary object, which contains all Event objects with one or more client references, so multiple requests for the same Event object will return the same object reference. The UserID and clientHostName params are used to add a ClientReference object to the Event. The ClientReference object is used to track what clients have active references to an Event object, and handle client abort situations using a |

TABLE I-continued

Principal operations of Event Manager 80

| Operation | Description |
|---|---|
| | communications event handler. When an Event object no longer has any client references, it will be removed from the Event Dictionary. |
| ForceEventConflict(EventIDs, ConflictComments) | This operation is called to force two or more Events into conflict with each other. It adds one or more ConflictingEvent objects to each Event object being forced into conflict. |
| UpdateApprovalStatus(EventID, ApprovalStatus, UserID) | This operation is called to update the approval status (ApprovalStatus param) of the Approval Authority (UserID param) associated with an Event (EventID param). If all Approval Authorities have approved the Event, the Approve( ) operation will be called. |
| GetCustomerImpacts (NetworkType, EquipmentPointSpec) | This operation is called to get all circuits and customers that are associated with the given MECCA equipment point spec. This operation queries the TRS tables in CDP to get this information. |
| GetEventList(SearchCriteria) | This operation is called to get a pre-defined list of Event attributes for Events that match the given search criteria. The search criteria is an array of attribute/value pairs (e.g. "Status= Approved"). |
| CopyEvent(EventID) | This operation instantiates the Event for the given EventID; assigns it a new unique EventID; removes all EventHistory, ViolatedRule, ConflictingEvent, CompletionInfo objects; and resets all ApprovalAuthority objects. Lastly, the reference to the new Event object is passed back to the client. |
| GetApprovalStatus(EventID) | This operation is called to get a list of Approval Authorities assigned to an Event, and their current approval status. |

A state is a condition during the life of an object when the object satisfies certain parameters, performs some action, or waits for an event. The state of an object may be characterized by the value of one or more of the attributes of the class. For example, upon detection of an out of guideline (OOG) rule violation, the Event object sets its OOG flag indicator. As listed in Table II, the following states exist for an Event 85: Creation, Waiting Review, OOG/Conflict, Denied/Cancelled, Approved, In Maintenance, and Completed.

Table II: Transition states of Event Objects 85

TABLE II

Transition states of Event Objects 85

| CURRENT STATE | TRANSITIONED TO STATE | ACTIONS |
|---|---|---|
| Creation | OOG/Conflict | Requester forces an OOG override condition. BRM detects conflict. Equipment validation fails after the Event is entered. |
| | Waiting Review | Transient state to wait for an update. BRM determined it could be auto-approved and goes through this state quickly. |
| Waiting Review | Approved | BRM auto-approves the Event. Event Coordinator manually approves. Final approval received from approving authorities. NCCO overrides all approvals and approves. |
| | Denied/Cancelled | Event Coordinator manually status changes. |
| | OOG/Conflict | Event Coordinator forces conflict. BRM determines a OOG condition based on window timing and approval timing rules. BRM determined a conflict with another Event though an update or another new or updated Event. |
| OOG/Conflict | Waiting Review | Transient state to wait for an update after OOG or Conflict status is applied. |
| | Completed | Event Tracker forces the Event to Complete |
| Denied/Cancelled | | Final state of event that cannot be scheduled or performed. |
| Approved | Waiting Review | After the Event has been approved, before the maintenance window, either NCCO or the Requester can deny or cancel the Event. |
| | OOG/Conflict | Event Coordinator forces conflict. BRM determines a OOG condition based on window timing and approval timing rules. BRM determined a conflict with another Event though an update or another new or updated Event. |
| | In Maintenance | Based on the Event's Maintenance Window, the Event can be put into a Maintenance Mode. |
| In Maintenance | OOG/Conflict | The BRM can detect and OOG or conflict and force the Event into this state. |
| | Completed | The Event Tracker can close out the Event by updating its Completion information after the Events Maintenance or after the Actual Start Time of the Maintenance. |
| Completed | | Final stated for a Completed Event after Maintenance is performed. |

The Creation State (or Initialization State) is the beginning state of the Event object. This state is achieved when the request work flow process is first started for a maintenance event. During the processing of the event, the Event Manager 80 is contacted and, in turn, communicates with the BRM to determine various validation check points statuses. Upon completion of the work flow process, the BRM asserts the Event into its working memory to check all remaining conflicts with other Events in the NCMS 101. The BRM is also contacted to send out a Submit notification. Additionally, the Event Services CORBA server is contacted to broadcast a message, to the appropriate channel, for the subscribing GUI clients to receive the message that a new Event has been created. From this state, the Event can be either in OOG/Conflict status or placed in a Waiting Review state.

The Waiting Review state represents a transition state for an entity to review the Event and to make a decision on its status. The Event stays in this state until either an Event Coordinator has reviewed it or the system automatically approves or updates the Event. This state will be automatically transitioned to Approved if the NCMS 101 determines that all the business rules have been completed. The Event rules are set up so the Event does not require a manual review. Alternatively, the Event remains in waiting review state until either an Event Coordinator or NCCO operator reviews and status changes it or forces the Event in conflict. The BRM can also engage the Event in conflict with another Event at any time or based on timing triggers (e.g., waiting for approvals); thereafter, the BRM can place the Event in an OOG/Conflict state.

The OOG/Conflict state represents a condition whereby the BRM detects a rule violation on the Event. These rule violations are categorized as either OOG or in Conflict. The OOG/Conflict state can transition to another state, at any time in the life-cycle of the Event, upon the BRM detecting a conflict or OOG condition on the Event.

Based on the type of OOG condition or conflict, the Event may initiate a message to the BRM to send out a notification. BRM determines the exact type of notification to be sent out, as necessary. The Event Manager server is instructed to broadcast a message to the GUI clients to notify these clients that a change has occurred in the status of the Event. In the case of a conflict, the BRM creates a conflict analysis object indicating the nature of the conflict with other Events. If a OOG condition is detected, the BRM creates OOG analysis objects to be associated to the Event.

The Event can transition out of the OOG/Conflict state in response to the following three conditions: (1) manually/automatically reviewed, (2) conflict solved, and (3) event completed. In the first condition, the Event transitions to the Waiting Review state and then to one of the Approval States (Approved, Denied, Cancelled) if an Event Coordinator manually updates the status. Additionally, the Event can be automatically reviewed if a Request for Approval is received by an Approval Authority. If a conflict is solved (i.e., second condition), the Event transitions out of the OOG/Conflict state. In particular, because the BRM is constantly receiving updates to conflict statuses either through direct updates to the Events or by resolving through the Update or Approval processes, conflicts are continually being solved. Another way to transition out of the OOG/Conflict state is to complete the event. While in the In Maintenance state, the Event could violate rules associated with the Maintenance Window. NCCO and Event Tracker/Coordinators have the ability to complete an Event that in effect closes the event for future updates and purges it from "working memory".

As mentioned above, the approval states include the Approved state, Denied state, and Cancelled state. The Denied/Cancelled state represents a final denied or cancelled status of the event. Both of these states are similar and represent a termination state for the Event. However, the Event performs different actions for Denied state than the Cancelled state. The approved state represents a final approval state for the Event. This state can either be reached by auto-approving based on the BRM or manually approved by the Event Coordinator. For each of the approval states, the BRM is contacted to send out a type of notification; the Event Manager server is also contacted to broadcast a message to the subscribing GUI clients.

The In Maintenance state represents an active maintenance state of the Event. When the Maintenance Window is reached or initiated, the BRM will activate rules checking on the Event until it is completed. The Event Manager server is contacted to broadcast a message to the subscribing GUI clients, indicating that the status of the Event has changed.

The Completed state is reached only when after an Event has started maintenance. As with the approval states, the BRM is contacted to send out a type of notification. Further, the Event Manager server broadcasts a message to the subscribing GUI clients to notify them of the change in event status.

The EventProfileManager 90 is another CORBA object factory and is located on the SysAdmin server within the Administration Domain. The EventProfileManager 90 is a persistent object that is responsible for system-wide management of all event category, event code, and event window specifications, and, in addition, all the threshold values associated with each event type, such as color, timing, and popups. The EventProfileManager object 90 is activated as a CORBA shared server, ensuring that only one instance of this server exists to service any number of clients instantiates four helper objects for the actual management of event code categories, event codes, event windows, and event threshold values.

To access an object that is managed by the EventProfileManager 90, the requestor must first bind to the EventProfileManager 90 and retrieve its object reference. Once that is done, the requester may invoke operations on the EventProfileManager 90 to retrieve one or more references to its managed objects. This sequence of steps is general for all objects managed by the EventProfileMananager 90. Table III provides a list of the principal Event Profile Manager operations.

Table III: Principal operations of Event Profile Manager 90

TABLE III

Principal operations of Event Profile Manager 90

| Operation | Description |
| --- | --- |
| CreateEventCode( ) | Creates a new event code and returns its object reference. |
| CreateEventCodeCategory( ) | Creates a new event code category and returns its object reference. |
| CreateEventWindow( ) | Creates a new event window and returns its object reference. |
| GetEventCode( ) | Returns an object reference to the target event code. |
| GetEventCodes( ) | Returns an array of object references to all the event codes. |
| GetEventCodeCategory( ) | Returns an object reference to the target event code category. |
| GetEventCodeCategories( ) | Returns an array of object references to all the event code categories. |
| GetEventWindow( ) | Returns an object reference to the target event window. |
| GetEventWindows( ) | Returns an array of object references to all the event windows. |
| Close( ) | Deallocates all the objects under the ownership of EventProfileManager and terminates. |

As seen from Table III, the Event Profile Manager creates Event Windows object 95. That is, for each event window defined in the system, the EventProfileManager 90 instantiates a singleton, transient EventWindow object 95. Each EventWindow object 95 serves as a time context for a set of events that has been submitted into the system. Although there are no references kept between an event window and the set of events that fall within it, an EventWindow 95 knows what Events belong to it by using a startDate attribute on each Event. For each EventWindow 95, the user can specify up to five target dates to pull customer impacts. When each target date is arrived at, the EventProfileManager 90 will spawn a process (thread) to pull customer impacts for all those Events that fall within that particular EventWindow 95. Like the Events 85, the Event Windows 95 are dynamic transient objects that undergo state changes wherein at each state certain core business processes will be executed by rules.

Due to the complexity of the Event Manager 80 and the EventProfileManager 90, and the transient nature of their respective objects, method calls to the Event 85 and EventWindow 95 CORBA objects are complex and difficult to make. As discussed in the Background of the Invention section above, this makes it difficult for less sophisticated change management personnel to implement their business policies in a rule automation technology system. Therefore, according to the present invention, an adaptation design pattern is extended within the rule engine domain to provide helper methods for these CORBA objects; Object Agents are created to represent the CORBA objects. Helper methods can then be provided within the object agents to encapsulate the complex CORBA calls to the real CORBA objects to provide a simpler interface through methods that make business sense to users. In short, the Object Agents abstract out the complexity of the CORBA object.

Specifically, Event Agents 88 are used to wrapper the Event objects 85. The Event Agent 88 is inserted into the agenda 60 of the IlrContext 40 and the rules 20 are fired on the Agent 88 rather than the Event object 85. These Event Agents 88 have an easy to use API that the rule designers can use in their development of the rule conditions. This helps to hide the complexity of the CORBA interfaces. Together with the IlrContext 40, the Event Agents 88 will gather and report information about the true maintenance event. This also lowers the overhead of CORBA requests being passed between the servers. Moreover, the Event Agent API also simplifies processes such as checking if a piece of equipment is valid. For example, one method on the Event Agent 88 can make several calls to the Event 85, rebinding to the servers, and parsing large data sets.

Window Agents 98 are used in the same manner as the Event Agents 88. The Window Agent 98 wrappers the EventWindow objects 95. There are fewer rules associated with maintenance windows but their business processes still remain important in the NCMC system. System events for each window will be triggered by rules. This includes both an alert notification sent to individuals for their Event and an event to re-pull customer impacts to check for changes in the network before the maintenance is started.

In addition to providing a simple interface, the Event Agent 88 and EventWindow Agent 98 allow an exception to occur without disrupting a transaction occurring within the rule agenda 60. As discussed in the Background of the Invention above, existing rule automation technology systems do not allow for an exception without disrupting or destroying a business transaction when the exception occurs. More specifically, when conditions of the rules 20 are matched with business objects, during the creation of the rule agenda 60, if some error occurs in the condition matching process the RETE algorithm of the rule agenda 60 cannot process the error and the transaction will be exited. Therefore, a number of rules normally associated with the transaction will not be fired and actions associated with the business will not be performed. The Event Agent 88 and EventWindows Agent 98, provide an interface to filter out any errors before they enter the rule agenda 60 and disrupt the business transaction. That is, the object agents allow the exception to be caught in the agent rather than the rule agenda 60. The process for reading Rules Files provides an example of how the object agents are used to allow an exception without disrupting the rule agenda. During the startup process of the server the system will perform initialization operations to process the rulesets 30 and connect to the other necessary NCMC CORBA Services. The server will first look for all the IlrRules files 10 in the rules sub-directory. This sub-directory must be made available to the CLASSPATH variable. The design strategy is to use a global properties file and to retrieve the variables defining either the path or the exact name and location for each rule file. If one of these files is not found the system will send a notification (page & e-mail) to System Administration and log the error. However, the server will not shut down, rather it will follow the fail over condition. That is, the server will throw an exception indicating a warning condition. This warning condition will be used by the system to send messages to the client system, if desired. The system will also generate an internal rule by default depending on the type of context and assert it into the rule context. The system will also flag the incoming request for NCMC to manually review the Event. When the rules file is corrected the NCMC Coordinator must either go into update mode on the Event or initiate a rule check process. This rule check process will only be a function available to NCMC Coordinators.

Figure 6:
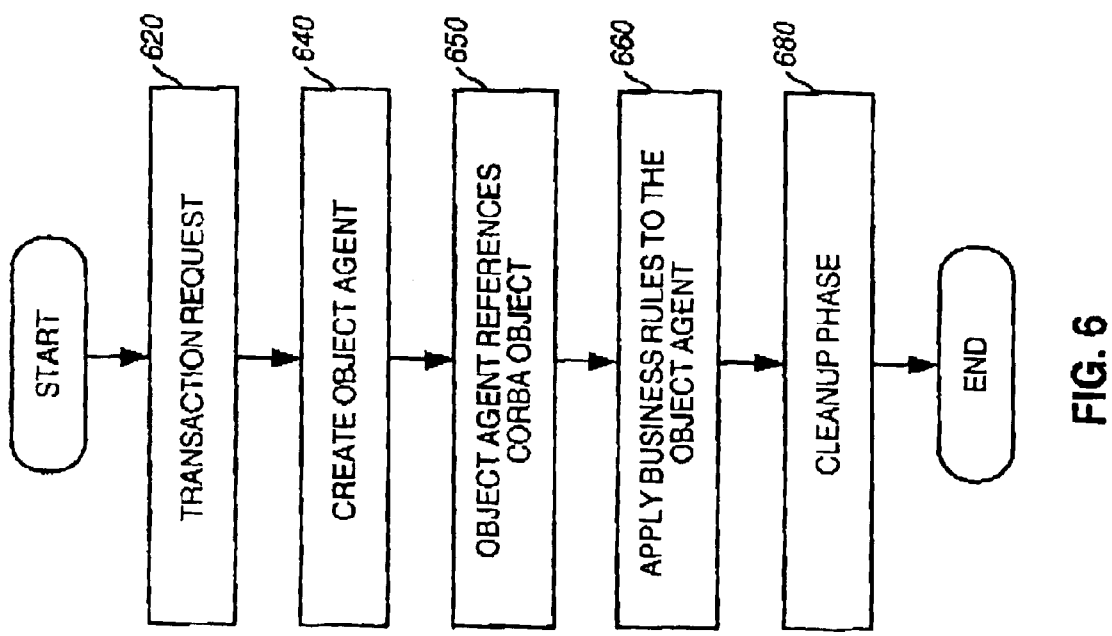
FIG. 6 is a high level flow chart showing how object agents are used to complete a business transaction in a Rules Automation technology system implemented using the CORBA specification, in accordance with an embodiment of the present invention.

FIG. 6 is a flow chart showing how object agents are used to complete a business transaction in a Rules Automation technology system implemented using the CORBA specification. Description of this flow chart refers to various components in the preceding FIGS. 1 through 5. The process begins with a transaction request as in step 620. The transaction request can be initiated by a user or by the NCMS 101 itself. The user initiated request could be a variety of things from field engineers 111 opening a new maintenance ticket or updating a previous maintenance request by inputting additional data into the request, to the NCCO 105 approving, denying, or canceling a maintenance request. A system transaction request occurs when something is triggered, indicating that the maintenance ticket or event's state should change. This could be a timer flag, alert, or some other trigger initiated by the NCMS 101.

Once the transaction request has been made, an object agent is created in step 640. The transaction request enters the NCMS 101 and indicates what maintenance request or ticket needs to be opened to perform the-transaction. In the internal processing of the BRM 413, an object agent is created and the ticket reference is passed to the object agent which is a JAVA agent. In step 650, the object agent references the CORBA object that the agent is designed to represent. Therefore, instead of sending a request to a method on the CORBA object, the request is sent to a method on the object agent which provides an applications interface that causes the agent to call and open the CORBA object.

Once the object agent references the corresponding CORBA object, the business rules 20 are applied to the object agent, per step 660. When all rules are fired on the agent, the transaction is complete and the system enters a cleanup phase (step 680). During the cleanup phase 680, the object agent is "garbage collected" along with all objects that are in the IlrContext 40. As part of the garbage collection, the agent can safely unbind from the CORBA objects by either initiating an update request or a save request on the CORBA object. That is, the object agent either commits the transaction or saves the CORBA object. If the objective of the transaction request was to get information from the CORBA object, the transaction is committed. If the objective of the transaction request was to send information to the CORBA object, then the information represents some state change or information change in the CORBA object, and the agent needs to perform a save action or save request that persistently stores that CORBA object back to the relational database 309 where the object awaits the next transaction request.

Figure 7A:
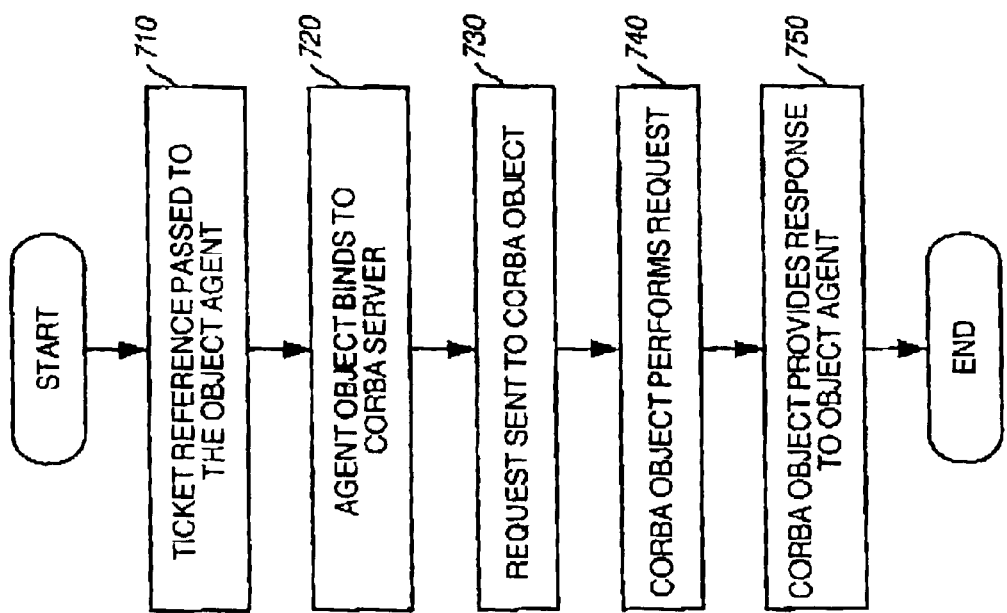
FIG. 7A is a flow chart showing the interaction between an object agent and a CORBA object, according to an embodiment of the present invention.

FIG. 7A is a flow chart depicting the flow of events within step 650 of FIG. 6, wherein the object agent references the CORBA object. Once the object agent has been created by the internal processing of the BRM 413, the ticket reference is passed to the object agent in step 710. The agent has a constructor built into it which enables the object agent to communicate with a CORBA server, such as the EventManager 80 or EventProfileManager 90. This constructor of the object agent allows the object agent to bind to the CORBA server that manages the CORBA object which the object agent represents, as shown in step 720. In step 720, the constructor first requests a bind to the CORBA server before binding to the server and requesting a live reference to the corresponding CORBA object through the ORB. The ORB then searches for and retrieves the registered CORBA object that the request represents, and sends the request to the object (step 730). The CORBA server then performs the request in step 740 and returns a response back to the object agent, as in step 750. The agent provides the necessary data or massages that are needed from the CORBA object by using special helper methods. These methods are created within the agent that perform multiple functions at one time, thereby permitting a rules engineer to work only with an agent object.

The object agent must use a transport mechanism when referencing the CORBA object. Therefore, once the object agent gets a live reference to the CORBA object represented by the agent, the agent pulls a proxy object to the local memory domain within the JAVA virtual machine. That is, in creating a live reference to the CORBA object, a proxy object is created in the memory of the CORBA server. When the agent accesses the CORBA object, the request is directed from the agent to the local proxy object which then marshals the request through and passes it to the CORBA object in a separate memory space of the server. When the CORBA object returns the response, the response is again marshaled back through to the proxy object and returned to the agent that made the request.

FIG. 7B is a flow chart depicting the flow of events within step 660 of FIG. 6, wherein the business rules are applied to the object agent. Once the agent creates a live reference to the CORBA object, the object agent is asserted into the IlrContext 40 nodal network, as in step 760. As previously discussed, the IlrContext 40 is attached to the Rule set 30, which contains all the business rules 20. The IlrContext 40 constructs a nodal network of the asserted agents and other objects, as well as the business rules 20. In the nodal network, conditions of the rules are matched with the agents and other objects within the IlrContext 40, and agents and objects that meet the conditions are inserted into the Rule agenda 60 (step 765). The agenda 60 prioritizes the nodal network in such a way that when a fire rules sequence is performed, the sequence begins with the first object that is being worked with. All actions of all business rules 20 are then applied to the agents and other objects that were inserted into the agenda 60. Thus, the actions are performed on all objects that meet the conditions of the rules. Depending on the makeup of a particular rule, the action may be to either update or retrieve information from the agent. The rule then sends a request to the agent to perform the action. Once the agent gets this request, the agent then uses the created live reference to the CORBA object and sends the request to the CORBA object as seen in step 775.

When the agent initiates the request to the CORBA object, the CORBA object can either throw an exception, or return a response to the object agent. If a response is returned, in step 795 the actions of the rule are applied to the agent as enhanced by the response. The process repeats until all actions of all rules are applied to the object agent and the step of applying the business rules to the object agent ends and the clean-up phase 680 of FIG. 6 is entered into.

If the CORBA object returns an exception, the object agent captures the exception in step 785 and internally processes the exception in step 790. This prevents the exception from being passed into the Rule agenda 60 where the business transaction would be destroyed. Once the exception is processed, actions that were not affected by the exception are performed on the object agent in step 795, and the process is repeated until all actions of all rules are applied to the object agent and the step of applying the business rules to the object agent ends and the clean-up phase 680 of FIG. 6 is entered into and the transaction is completed. This allows the agenda to process subsequent transactions despite the exception.

The CORBA object can return an exception for a variety of reasons. As one example, an exception will be thrown when a request is made to an unknown CORBA object. An unknown CORBA object emerges when either the system had previously gone down, or a memory problem occurred or some other problem caused the referenced CORBA object to be destroyed. In this situation, the object agent captures the exception in step 785 and processes the exception by rebinding to the event manager, requesting a live reference to the object, and re-sending the request until the referenced CORBA object becomes available. Moreover, the transaction continues and all unaffected rule actions are performed on unaffected object agents and other objects in step 795.

As another example, an exception will be thrown if a login request is made by an invalid user. This means that the user object does not exist to the system. In this situation, the exception is captured in step 785 and the exception is processed in step 790 wherein a user object will be created to prevent the transaction from being destroyed. Because the user did not exist in the NCMS 101, step 790 will create a user profile and an object that represents profile so that the request can be sent and processed with the created user object.

Figure 8:
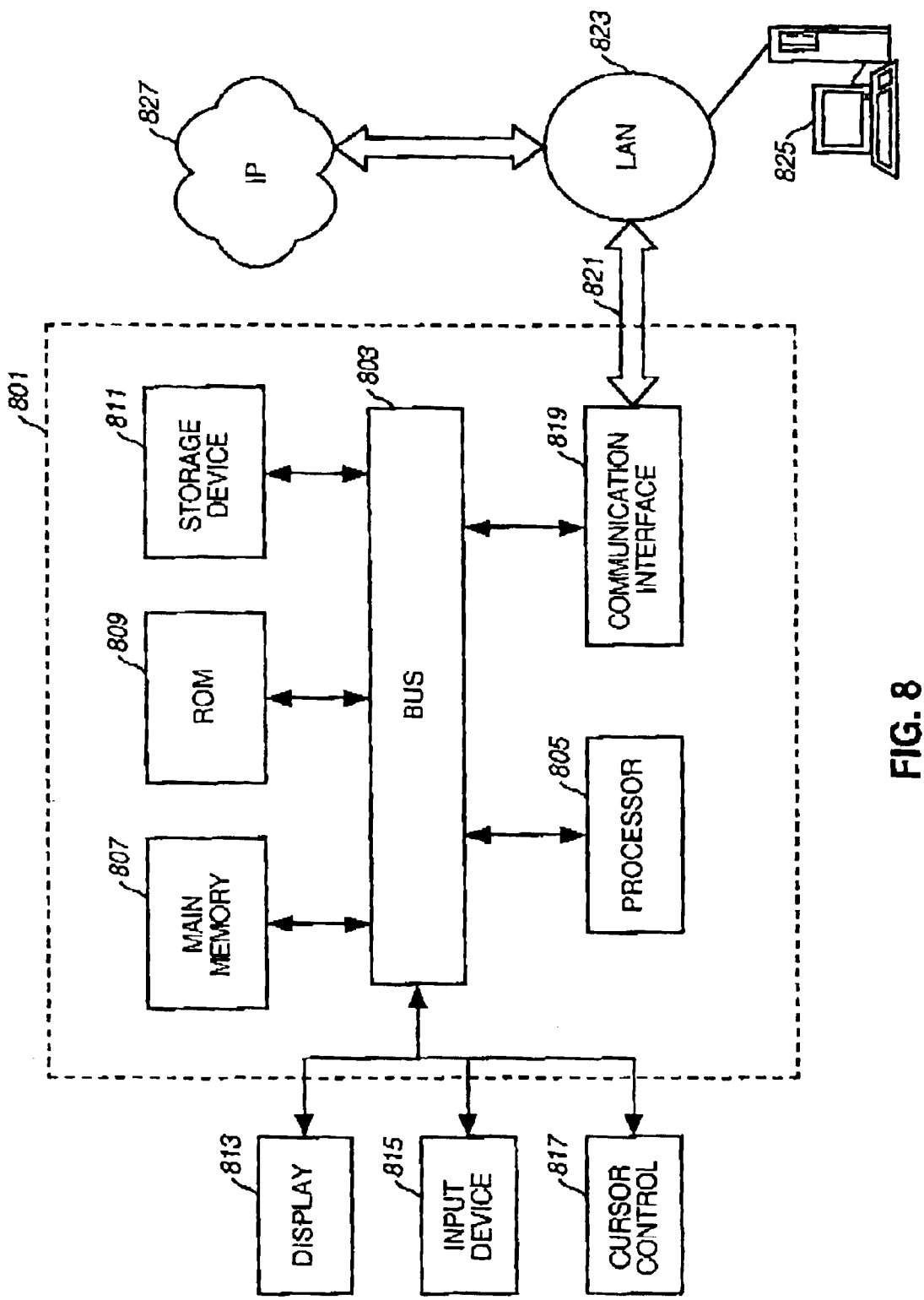
FIG. 8 is a diagram of a computer system that can perform in accordance with an embodiment of the present invention.

FIG. 8 illustrates a computer system 801 upon which an embodiment according to the present invention may be implemented. Computer system 801 includes a bus 803 or other communication mechanism for communicating information, and a processor 805 coupled with bus 803 for processing the information. Computer system 801 also includes a main memory 807, such as a random access memory (RAM) or other dynamic storage device, coupled to bus 803 for storing information and instructions to be executed by processor 805. In addition, main memory 807 may be used for storing temporary variables or other intermediate information during execution of instructions to be executed by processor 805. Computer system 801 further includes a read only memory (ROM) 809 or other static storage device coupled to bus 803 for storing static information and instructions for processor 805. A storage device 811, such as a magnetic disk or optical disk, is provided and coupled to bus 803 for storing information and instructions.

Computer system 801 may be coupled via bus 803 to a display 813, such as a cathode ray tube (CRT), for displaying information to a computer user. An input device 815, including alphanumeric and other keys, is coupled to bus 803 for communicating information and command selections to processor 805. Another type of user input device is cursor control 817, such as a mouse, a trackball, or cursor direction keys for communicating direction information and command selections to processor 805 and for controlling cursor movement on display 813.

According to one embodiment, CORBA wrappers are provided by computer system 801 in response to processor 805 executing one or more sequences of one or more instructions contained in main memory 807. Such instructions may be read into main memory 807 from another computer-readable medium, such as storage device 811. Execution of the sequences of instructions contained in main memory 807 causes processor 805 to perform the process steps described herein. One or more processors in a multi-processing arrangement may also be employed to execute the sequences of instructions contained in main memory 807. In alternative embodiments, hard-wired circuitry may be used in place of or in combination with software instructions. Thus, embodiments are not limited to any specific combination of hardware circuitry and software.

Further, the code instructions which implement the CORBA wrappers may reside on a computer-readable medium. The term "computer-readable medium" as used herein refers to any medium that participates in providing instructions to processor 805 for execution. Such a medium may take many forms, including but not limited to, non-volatile media, volatile media, and transmission media. Non-volatile media includes, for example, optical or magnetic disks, such as storage device 811. Volatile media includes dynamic memory, such as main memory 807. Transmission media includes coaxial cables, copper wire and fiber optics, including the wires that comprise bus 803. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 805 for execution. For example, the instructions may initially be carried on a magnetic disk of a remote computer. The remote computer can load the instructions relating to the real time environment to control call processing remotely into its dynamic memory and send the instructions over a telephone line using a modem. A modem local to computer system 801 can receive the data on the telephone line and use an infrared transmitter to convert the data to an infrared signal. An infrared detector coupled to bus 803 can receive the data carried in the infrared signal and place the data on bus 803. Bus 803 carries the data to main memory 807, from which processor 805 retrieves and executes the instructions. The instructions received by main memory 807 may optionally be stored on storage device 811 either before or after execution by processor 805.

Computer system 801 also includes a communication interface 819 coupled to bus 803. Communication interface 819 provides a two-way data communication coupling to a network link 821 that is connected to a local network 823. For example, communication interface 819 may be a network interface card to attach to any packet switched local area network (LAN). As another example, communication interface 819 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 819 sends and receives electrical, electromagnetic or optical signals that carry digital data streams representing various types of information.

Network link 821 typically provides data communication through one or more networks to other data devices. For example, network link 821 may provide a connection through local network 823 to a host computer 825 or to data equipment operated by a service provider, which provides data communication services through an IP (Internet Protocol) network 827 (e.g., the Internet). LAN 823 and IP network 827 both use electrical, electromagnetic or optical signals that carry digital data streams. The signals through the various networks and the signals on network link 821 and through communication interface 819, which carry the digital data to and from computer system 801, are exemplary forms of carrier waves transporting the information. Computer system 801 can transmit notifications and receive data, including program code, through the network(s), network link 821 and communication interface 819.

The techniques described herein provide several advantages over prior approaches to providing rule automation technology. The invention provides CORBA wrappers for rule engine technology in order to simplify the interface to CORBA objects. Moreover, the CORBA wrappers interface allows a mechanism for catching errors before they enter the rule agenda thereby preventing the disruption of the rule agenda. These features allow for a near real time environment for rule engine technology.

Obviously, numerous modifications and variations of the present invention are possible in light of the above teachings. It is therefore to be understood that within the scope of the appended claims, the invention may be practiced otherwise than as specifically described herein.

What is claimed is:

1. A computer implemented system for providing wrappers for rules automation technology, the system comprising:

a business rule corresponding to a business process;

a business object; and an object agent representing the business object, wherein the object agent matches conditions in an agenda within a context class for executing a business rule; and the object agent is inserted into the agenda so that the business rule is directly applied to the object agent and indirectly applied to the business object to perform a business transaction.

2. The system as claimed in claim 1, wherein the object agent comprises a helper method that is configured to encapsulate complex method calls, the complex method calls corresponding to the business object.

3. The system as claimed in claim 2, wherein the helper method is configured to perform at least one of making several method calls to the corresponding business object, rebinding to servers containing the business object, and parsing large data sets.

4. The system as claimed in claim 1, wherein the object agent is configured to catch an exception before the exception enters the agenda.

5. The system as claimed in claim 4 further comprising a mechanism configured to generate error messages based on the exception, the error messages notifying users about the exception.

6. A computer implemented system for providing wrappers for rules automation technology, the system comprising:
   a business rule corresponding to a business process;
   a business object;
   an object agent representing the business object;
   a business rules agenda configured to execute the business rule, wherein the object agent is inserted into the agenda so that the business rule is directly applied to the object agent and indirectly applied to the business object to perform a business transaction;
   a ruleset class configured to manage the business rule, the business rule comprising conditions and actions; and
   a context class comprising the agenda and a working memory in which the business object and the object agent are stored, wherein the object agent is condition matched with the business rule according to the conditions, and the object agent matching the conditions is stored in the agenda, the actions of the business rule being performed on the object agent in the agenda to thereby indirectly apply the business rule to the business object.

7. The system as claimed in claim 1 wherein the business object comprises a transient object comprising a plurality of life states.

8. A computer implemented method for providing wrappers for rules automation technology, the method comprising:
   providing a business rule corresponding to a business process;
   providing a business object;
   providing an object agent representing the business object, wherein the object agent matches conditions in an agenda within a context class for executing a business rule; and
   inserting the object agent into the agenda so that the business rule is directly applied to the object agent and indirectly applied to the business object.

9. The method as claimed in claim 8, further comprising:
   providing a helper method for the object agent, the helper method encapsulating complex method calls corresponding to the business object.

10. The method as claimed in claim 9, further comprising:
    using the helper method to perform at least one of the steps of:
    making several method calls to the corresponding business object,
    rebinding to servers containing the business object, and
    parsing large data sets.

11. The method as claimed in claim 8, further comprising:
    using the object agent to catch an exception before the exception enters the agenda.

12. The method as claimed in claim 11, further comprising:
    generating error messages based on the exception, the error messages notifying users about the exception.

13. The method as claimed in claim 8, wherein the step of providing a business object further comprises providing a transient business object having a plurality of life states.

14. A computer implemented method for providing wrappers for rules automation technology, the method comprising:
   providing a business rule corresponding to a business process:
   providing a business object;
   providing an object agent representing the business object;
   providing a business rules agenda for executing the business rule;
   inserting the object agent into the agenda so that the business rule is directly applied to the object agent and indirectly applied to the business object;
   managing the business rule using a ruleset class;
   providing conditions and actions for the business rule;
   providing a context class which includes the agenda and a working memory in which the business object and the object agent are stored; condition matching the object agent with the business rule according to the conditions; storing the object agent matching the conditions in the agenda; and
   performing the actions of the business rule on the object agent in the agenda to indirectly apply the business rule to the business object.

15. A computer readable medium carrying one or more sequences of one or more instructions for providing wrappers for rules automation technology, the one or more sequences of one or more instructions including instructions which, when executed by one or more processors, causes the one or more processors to perform steps comprising:
   providing a business rule corresponding to a business process;
   providing a business object;
   providing an object agent representing the business object, wherein the object agent matches conditions in an agenda within a context class for executing a business rule; and
   inserting the object agent into the agenda so that the business rule is directly applied to the object agent and indirectly applied to the business object.

16. The computer readable medium as claimed in claim 15, wherein the one or more processors are caused to perform steps further comprising:
   providing a helper method for object agent; the helper method encapsulating complex method calls corresponding to the business object.

17. The computer readable medium as claimed in claim 16, wherein the one or more processors are caused to perform steps further comprising:
   using the helper method to perform at least one of the steps of:
   making several method calls to the corresponding business object,
   rebinding to servers containing the business object, and
   parsing large data sets.

18. The computer readable medium as claimed in claim 15, wherein the one or more processors are caused to perform steps further comprising:
   using the object agent to catch an exception before said exception enters the agenda.

19. The computer readable medium as claimed in claim 18, wherein the one or more processors are caused to perform steps further comprising:
   generating error messages based on the exception, the error messages notifying users of the computer implemented method about said exception.

20. The computer readable medium as claimed in claim 15, wherein the step of providing a business object comprises providing at least one transient business object having a plurality of life states.

21. A computer readable medium carrying one or more sequences of one or more instructions for providing wrappers for rules automation technology, the one or more sequences of one or more instructions including instructions which, when executed by one or more processors, causes the one or more processors to perform steps comprising:

provide a business rule corresponding to a business process;

providing a business object;

providing an object agent representing the business object;

providing a business rules agenda for executing the business rule;

inserting the object agent into the agenda so that the business rule is directly applied to the object agent and indirectly applied to the business object;

managing a business rule using a ruleset class;

providing conditions and actions for the business rule;

providing a context class which includes the agenda and a working memory in which a business object and an object agent are stored;

condition matching the object agent with the business rule according to the conditions;

storing the object agent matching the conditions in the agenda; and performing the actions of the business rule on the object agent in the agenda to indirectly apply the business rule to the business object.

22. A method for providing wrappers for rule automation, the method comprising:

storing a business object and an associated object agent, wherein the object agent matches conditions in an agenda within a context class for executing a business rule; and inserting the object agent into the agenda for performing actions of the business rule on the object agent in the agenda to indirectly apply the business rule to the business object.

23. A computer readable medium carrying one or more sequences of one or more instructions for providing wrappers for rules automation technology, the one or more sequences of one or more instructions including instructions which, when executed by one or more processors, causes the one or more processors to perform steps comprising:

storing a business object and an associated object agent, wherein the object agent matches conditions in an agenda within a context class for executing a business rule; and inserting the object agent into the agenda for performing actions of the business rule on the object agent in the agenda to indirectly apply the business rule to the business object.

24. A system for providing wrappers for rule automation, the system comprising:

means for storing a business object and an associated object agent, wherein the object agent matches conditions in an agenda within a context class for executing a business rule; and means for inserting the object agent into the agenda for performing actions of the business rule on the object agent in the agenda to indirectly apply the business rule to the business object.

* * * * *